United States Patent
Yamanaka et al.

(10) Patent No.: US 10,882,979 B2
(45) Date of Patent: Jan. 5, 2021

(54) GOLF BALL

(71) Applicant: BRIDGESTONE SPORTS CO., LTD., Tokyo (JP)

(72) Inventors: Eiji Yamanaka, Tokyo (JP); Daisuke Arai, Saitama (JP)

(73) Assignee: BRIDGESTONE SPORTS CO., LTD., Tokyo (JP)

(*) Notice: Subject to any disclaimer, the term of this patent is extended or adjusted under 35 U.S.C. 154(b) by 0 days.

(21) Appl. No.: 16/384,093

(22) Filed: Apr. 15, 2019

(65) Prior Publication Data

US 2020/0002514 A1   Jan. 2, 2020

(30) Foreign Application Priority Data

Jun. 29, 2018  (JP) ................................ 2018-124751

(51) Int. Cl.
| | | |
|---|---|---|
| *A63B 37/06* | (2006.01) | |
| C08L 9/00 | (2006.01) | |
| *A63B 37/00* | (2006.01) | |
| *C08K 5/14* | (2006.01) | |
| *C08K 3/30* | (2006.01) | |
| *C08K 5/372* | (2006.01) | |

(52) U.S. Cl.
CPC ............ C08L 9/00 (2013.01); A63B 37/0062 (2013.01); A63B 37/0074 (2013.01); C08K 3/30 (2013.01); C08K 5/14 (2013.01); C08K 5/372 (2013.01); C08K 2003/3063 (2013.01); C08K 2003/3081 (2013.01)

(58) Field of Classification Search
CPC ................................................ A63B 37/0051

USPC .......................................................... 473/370
See application file for complete search history.

(56) References Cited

U.S. PATENT DOCUMENTS

| | | | |
|---|---|---|---|
| 2004/0147694 A1 | 7/2004 | Sone et al. | |
| 2012/0034441 A1* | 2/2012 | Adzima | C04B 14/42 428/219 |
| 2015/0065268 A1* | 3/2015 | Nakajima | A63B 37/006 473/373 |
| 2016/0362505 A1 | 12/2016 | Adkinson et al. | |

FOREIGN PATENT DOCUMENTS

| | | |
|---|---|---|
| JP | H11-035633 | 2/1999 |
| JP | 2015-047502 | 3/2015 |

OTHER PUBLICATIONS

U.S. Office Action dated Jul. 7, 2020 (U.S. Appl. No. 16/384,052).
U.S. Office Action for U.S. Appl. No. 16/384,052 dated Jan. 22, 2020.

* cited by examiner

*Primary Examiner* — Raeann Gorden
(74) *Attorney, Agent, or Firm* — IPUSA, PLLC

(57) ABSTRACT

A golf ball includes a core and a cover. The core is formed of a material molded under heat from a rubber composition. The rubber composition includes components (A) through (C). The components (A) through (C) are (A) a base rubber, (B) an organic peroxide, and (C) a water providing agent. The water providing agent releases water at a vulcanization temperature at which the rubber composition is vulcanized. The dissociation rate of water of the water providing agent in the case of heating the water providing agent up to the vulcanization temperature of the rubber composition is 60% by mass or more.

8 Claims, No Drawings

GOLF BALL

CROSS-REFERENCE TO RELATED APPLICATION

This application is based on and claims priority to Japanese patent application No. 2018-124751, filed on Jun. 29, 2018, the entire contents of which are incorporated herein by reference.

BACKGROUND OF THE INVENTION

1. Field of the Invention

The present invention relates to golf balls.

2. Description of the Related Art

It has been known that when striking a golf ball with a driver or the like, a lower (smaller) amount of spin on the golf ball leads to a longer distance and is thus significant. Therefore, golf balls that spin at lower rate when struck by a driver or the like have been studied.

For example, Japanese Laid-open Patent Publication No. 2015-47502 (JP 2015-47502) describes a golf ball that includes a core and a cover having one or more layers, in which the core is formed of a material molded under heat from a rubber composition including the following components (A) through (C):
(A) a base rubber,
(B) an organic peroxide, and
(C) water and/or a metal monocarboxylate.

According to the golf ball described in JP 2015-47502, it is possible to obtain a core material that is limited in resilience decrease over time and in energy loss, so that it is possible to maintain good resilience and reduce spin rate to increase distance.

SUMMARY OF THE INVENTION

According to an aspect of the present invention, a golf ball includes a core and a cover. The core is formed of a material molded under heat from a rubber composition. The rubber composition includes components (A) through (C). The components (A) through (C) are (A) a base rubber, (B) an organic peroxide, and (C) a water providing agent. The water providing agent releases water at a vulcanization temperature at which the rubber composition is vulcanized. The dissociation rate of water of the water providing agent in the case of heating the water providing agent up to the vulcanization temperature of the rubber composition is 60% by mass or more.

The object and advantages of the invention will be realized and attained by means of the elements and combinations particularly pointed out in the claims.

It is to be understood that both the foregoing general description and the following detailed description are exemplary and explanatory and not restrictive of the invention.

DETAILED DESCRIPTION OF EMBODIMENTS

Poor workability or kneadability in including water in a rubber composition may result in insufficient durability of a golf ball made using the rubber composition.

According to an aspect of the present invention, a low spin golf ball with durability is provided.

Specific examples of golf balls according to an embodiment of the present invention are described below with reference to the accompanying drawings.

A golf ball according to this embodiment includes a core and a cover, where the core is formed of a material molded under heat from a rubber composition including the following components (A) through (C):
(A) a base rubber,
(B) an organic peroxide, and
(C) a water providing agent.

As the water providing agent (C), a water providing agent that releases water at a vulcanization temperature at which the rubber composition is vulcanized and has a dissociation rate of 60% by mass or more of water in the case of heating the water providing agent up to the vulcanization temperature of the rubber composition may be used.

As described above, a golf ball according to this embodiment may include a core and a cover. First, components included in a rubber composition used in forming the core are described below.

(A) Base Rubber

The base rubber is not limited in particular, and various rubber materials may be used. It is preferable, however, to use polybutadiene (polybutadiene rubber) in particular.

Polybutadiene used for the base rubber has a cis-1,4-bond content of preferably 60% or more, more preferably, 80% or more, still more preferably, 90% or more, and particularly preferably, 95% or more, in its polymer chain. It is possible to prevent reduction in resilience by increasing the proportion of cis-1,4-bonds to the bonds in polybutadiene molecules.

The 1,2-vinyl bond content of the polybutadiene, which is not limited in particular, is preferably 2% or less, more preferably, 1.7% or less, and still more preferably, 1.5% or less, in its polymer chain. It is possible to prevent reduction in resilience by reducing the 1,2-vinyl bond content.

The polybutadiene has a Mooney viscosity ($ML_{1+4}$ (100° C.)) of preferably 20 or more, and more preferably, 30 or more. The upper limit of the Mooney viscosity, which is not limited in particular, either, is preferably 120 or less, more preferably, 100 or less, and still more preferably, 80 or less.

The Mooney viscosity is an industrial viscosity index (JIS [Japanese Industrial Standards] K 6300-1 (2013)) measured with a Mooney viscometer, which is a type of rotary plastometer, and uses $ML_{1+4}$ (100° C.) as a unit symbol, where M stands for Mooney viscosity, L stands for a large rotor (L-type), 1+4 stands for a pre-heating time of one minute and a rotor rotation time of four minutes, and 100° C. indicates that measurement is conducted under a condition of 100° C.

The polybutadiene may be synthesized using a rare-earth catalyst or a group VIII metal compound catalyst. In particular, polybutadiene synthesized using a rare-earth catalyst may be suitably used. Furthermore, these catalysts may be used in combination with one or more of an organoaluminum compound, an alumoxane, a halogen-containing compound, and a Lewis base on an as-needed basis. As the compounds illustrated above, those described in Japanese Laid-open Patent Publication No. 11-35633 may be suitably used.

In the case of synthesizing polybutadiene, it is particularly preferable to use a neodymium (Nd) catalyst that uses a neodymium compound, which is a lanthanum series rare-earth compound, among rare-earth catalysts. In this case, it is possible to obtain polybutadiene having a high cis-1,4-bond content and a low 1,2-vinyl bond content with excellent polymerization activity.

The base rubber may include polybutadiene rubber synthesized with a catalyst different from the lanthanum series rare-earth compound. The base rubber may alternatively include, for example, styrene-butadiene rubber (SBR), natural rubber, polyisoprene rubber, or ethylene-propylene-diene rubber (EPDM). These rubbers may be used alone or in any combination.

(B) Organic Peroxide

The organic peroxide, which is not limited in particular, is preferably an organic peroxide having a one-minute half-life temperature of 110° C. to 185° C. One or more types of organic peroxides may be used alone or in combination.

The amount of inclusion of the organic peroxide, which is not limited in particular, is preferably 0.1 parts by mass or more, and more preferably, 0.3 parts by mass or more, per 100 parts by mass of the base rubber.

The upper limit of the amount of inclusion of the organic peroxide, which is not limited in particular, either, is preferably 5 parts by mass or less, more preferably, 4 parts by mass or less, and still more preferably, 3 parts by mass or less, per 100 parts by mass of the base rubber. As the organic peroxide, commercially available products may be used, whose examples include those available under the trade names of Percumyl D, Perhexa C-40, Niper BW and Peroyl L (all manufactured by NOF Corporation), and Luperco 231XL (manufactured by Atochem Co.).

(C) Water Providing Agent

As disclosed in JP 2015-47502, it has been attempted to reduce the spin rate of golf balls obtained by including water in a rubber composition for forming a core.

It is known that the decomposition efficiency of an organic peroxide in a rubber composition changes with temperature, and the decomposition efficiency increases as the temperature increases from a certain temperature. If the temperature is too high, the amount of radicals into which the organic peroxide is decomposed becomes too large, thus resulting in recombination and deactivation of radicals. As a result, fewer radicals act effectively for crosslinking.

When the organic peroxide decomposes to generate decomposition heat at the time of core vulcanization, the temperature near the surface of the core is kept substantially the same as the temperature of a vulcanization mold, while the temperature near the center of the core becomes considerably higher than the mold temperature because of the accumulated decomposition heat of the organic peroxide that has decomposed from the outer side.

In the case of including water in the rubber composition, water is believed to serve as a promoter of the decomposition of the organic peroxide, and it is inferred that the inclusion of water in the rubber composition causes the above-described radical reaction to differ between the center and the surface of the core. That is, the inclusion of water in the rubber composition is believed to further promote the decomposition of the organic peroxide to further promote the deactivation of radicals, thereby further reducing the effective amount of radicals, near the center of the core. Therefore, it is possible to obtain a core whose crosslinking density differs between the surface and the center, and to obtain a core having different dynamic viscoelastic properties at its central portion. By providing a golf ball with such a core, it is possible to reduce the spin rate of the golf ball.

As described above, however, poor workability or kneadability in including water in a rubber composition may result in insufficient durability of a golf ball that is made using the rubber composition. Furthermore, part of water may evaporate during the kneading of the rubber composition. Therefore, water is not included as desired in part of the rubber composition.

JP 2015-47502 illustrates that a metal monocarboxylate can substitute for water. The metal monocarboxylate, however, generates and supplies water through a dehydration condensation reaction between two molecules, and therefore, the reaction does not progress uniformly. Accordingly, even when water is substituted with a metal monocarboxylate, a golf ball made using the rubber composition may not have sufficient durability. Furthermore, in the case of the metal monocarboxylate, most of the water is released not during vulcanization but during kneading at a lower temperature.

Therefore, the inventors of the present invention have made an earnest study of golf balls having low spin rate and durability. As a result, the inventors have discovered, to complete the present invention, that a golf ball having both low spin rate and durability can be obtained by using a water providing agent having a predetermined water dissociation characteristic instead of water as a water source, to increase workability and kneadability.

By using a water providing agent that releases water at the vulcanization temperature of the rubber composition, which is solid at the time of kneading the rubber composition, instead of water, which is liquid, as a water source as described above, it is possible to improve workability and kneadability, and in particular, to evenly disperse the water providing agent that is a water source in the rubber composition. Furthermore, the water providing agent has a dissociation rate of 60% by mass or more of water in the case of heating the water providing agent up to the vulcanization temperature of the rubber composition. Therefore, it is possible to efficiently supply a sufficient amount of water by the time the rubber composition is heated up to the vulcanization temperature.

Therefore, water can be supplied uniformly and included as desired in the rubber composition during vulcanization, and it is possible to obtain a golf ball having both low spin rate and durability by using the water providing agent.

The water providing agent is not limited to a particular kind, and various kinds of water providing agents may be used.

In terms of increasing water supply efficiency, however, it is preferable to use a water providing agent having a high moisture percentage as percentage by mass.

Specifically, the moisture content of the water providing agent in its molecular formula is preferably 6% by mass or more, and more preferably, 15% by mass or more.

For example, when the water providing agent, as hydroxide, releases water through decomposition reaction (dehydration reaction) that converts the water providing agent into oxide, the mass percentage of the maximum amount of water generated by the decomposition reaction in the molecular formula of the water providing agent before the decomposition serves as the moisture content in the molecular formula.

A higher moisture content of the water providing agent in its molecular formula is more preferable. The upper limit of the moisture content, which is not limited in particular, may be, for example, 90% by mass or less in terms of, for example, availability.

Preferably, the water providing agent can release as much water as possible when vulcanizing the rubber composition. The conditions of vulcanization such as a vulcanization temperature and a vulcanization time, however, may vary depending on components of the rubber composition, such as the base rubber and the organic peroxide. Therefore, it is preferable to select a water providing agent that can release a suitable amount of water for a purpose under vulcanization conditions such as a vulcanization time, in accordance with the vulcanization conditions of the rubber composition to which the water providing agent is added. Specifically, it is more preferable to select a water providing agent whose dissociation rate of water in the case of heating the water providing agent up to the vulcanization temperature (cumulative dissociation of water up to the vulcanization temperature) is 60% by mass or more.

As described below, the rubber composition is vulcanized at, for example, approximately 100° C. to approximately 200° C. A rubber composition used for the core of common golf balls is vulcanized, for example, at or around 155° C.

Therefore, the dissociation rate of water of the water providing agent in the case of heating the water providing agent up to 155° C., which is the vulcanization temperature of a rubber composition used for the core of common golf balls, namely, the cumulative dissociation rate of water in the case of heating the water providing agent up to 155° C., is preferably 60% by mass or more. Because the entirety of water is preferably dissociated during vulcanization, the dissociation rate of water in the case of heating the water providing agent up to 155° C. is preferably 100% or less.

Furthermore, the dissociation rate of water of the water providing agent during the kneading of the rubber composition is preferably low. Therefore, for example, the dissociation rate of water in the case of heating the water providing agent up to 90° C., namely, the cumulative dissociation rate of water in the case of heating the water providing agent up to 90° C., is preferably 60% by mass or less.

The water providing agent, which is not limited in particular, is preferably an inorganic compound, which has excellent storage stability. More specifically, as the water providing agent, one or more selected from, for example, hydrates of inorganic compounds and metal hydroxides may be suitably used.

As the water providing agent, specifically, one or more selected from, for example, calcium sulfate 0.5-hydrate, calcium sulfate dihydrate, aluminum sulfate 14-18-hydrate, magnesium sulfate heptahydrate, beryllium sulfate tetrahydrate, zirconium sulfate tetrahydrate, manganese sulfate pentahydrate, iron sulfate heptahydrate, cobalt sulfate heptahydrate, nickel sulfate hexahydrate, cupric sulfate pentahydrate, zinc sulfate heptahydrate, cadmium sulfate octahydrate, indium sulfate nonahydrate, zinc sulfate dihydrate, aluminum hydroxide, and magnesium hydroxide may be preferably used. Two or more of those may be used in mixture as the water providing agent.

As the water providing agent, more preferably, one or more selected from calcium sulfate 0.5-hydrate, calcium sulfate dihydrate, aluminum sulfate 14-18-hydrate, magnesium sulfate heptahydrate, aluminum hydroxide, and magnesium hydroxide may be used in terms of availability and the mass percentage of contained water.

Table 1 shows the moisture (hydration water) content (mass percentage) of calcium sulfate 0.5-hydrate, calcium sulfate dihydrate, aluminum sulfate 14-hydrate, and magnesium sulfate heptahydrate in molecular formula as moisture percentage. Furthermore, Table 1 also shows the cumulative dissociation rate of water up to each temperature as percentage by mass in the case of heating the above-described water providing agent.

The cumulative dissociation rate of water was calculated from a thermal weight loss curve obtained by measuring an evaluation sample of 10 mg in amount from room temperature up to 300° C. with a temperature rise rate of 5° C./min. in a nitrogen flow of 150 mL/min., using a TG-DTA apparatus (model: TG8121, manufactured by Rigaku Corporation) with $\alpha$-$Al_2O_3$ manufactured by Rigaku Corporation used as a reference substance.

The same samples as evaluated in Table 1 are used in the following examples.

TABLE 1

| | Moisture percentage | Cumulative dissociation rate of water up to each temperature (%) | | |
|---|---|---|---|---|
| | (%) | 90° C. | 120° C. | 155° C. |
| Calcium sulfate 0.5-hydrate | 6.21 | 25.6 | 96.3 | 98.1 |
| Calcium sulfate dihydrate | 20.93 | 0.0 | 60.0 | 93.4 |
| Aluminum sulfate 14-hydrate | 42.43 | 13.9 | 45.6 | 60.4 |
| Magnesium sulfate heptahydrate | 51.16 | 55.2 | 78.4 | 89.4 |

The above-described rubber composition may further include other components as desired than the above-described components (A) through (C).

The rubber composition may include components such as (D) an organosulfur compound, (E) a co-crosslinking agent, and (F) an inert filler as desired, and may also include (G) an antioxidant on an as-needed basis. These optional additive components are described in detail below.

(D) Organosulfur Compound

The above-described rubber composition may include an organosulfur compound. Examples of this organosulfur compound, which is not limited in particular, include thiophenols, thionaphthols, halogenated thiophenols, and metal salts thereof, and more specifically, include zinc salts of pentachlorothiophenol, pentafluorothiophenol, pentabromothiophenol and parachlorothiophenol, and diphenylpolysulfides, dibenzylpolysulfides, dibenzoylpolysulfides, dibenzothiazoylpolysulfides, and dithiabenzoylpolysulfides having 2 to 4 sulfurs. These may be used alone or in any combination. Of these, one or more selected from a zinc salt of pentachlorothiophenol and diphenyldisulfide may be suitably used.

By including an organosulfur compound in the rubber composition, it is possible to improve the resilience of a resulting golf ball.

The amount of inclusion of the organosulfur compound, which is not limited in particular, is preferably 0.1 parts by mass or more, more preferably, 0.2 parts by mass or more, and still more preferably, 0.5 parts by mass or more, per 100 parts by mass of the base rubber.

The upper limit of the amount of inclusion of the organosulfur compound, which is not limited in particular, either, is preferably 5 parts by mass or less, more preferably 4 parts by mass or less, and still more preferably, 3 parts by mass or less, per 100 parts by mass of the base rubber. By determining the range of the amount of inclusion of the organosulfur compound as described above, it is possible to prevent the material molded under heat from the rubber composition from becoming too soft.

(E) Co-Crosslinking Agent

As the co-crosslinking agent, a metal salt of an α,β-unsaturated carboxylic acid having 3 to 8 carbons may be preferably used. Examples of α,β-unsaturated carboxylic acids include acrylic acid, methacrylic acid, maleic acid, and fumaric acid, of which acrylic acid, which provides high resilience, is preferable. Example metals of the metal salt include zinc, sodium, magnesium, calcium, and aluminum, of which zinc is particularly preferable. Accordingly, as the co-crosslinking agent, zinc acrylate can be suitably used.

The amount of inclusion of the co-crosslinking agent, which is not limited in particular, is preferably 3 parts by mass or more and 60 parts by mass or less per 100 parts by mass of the base rubber. By including 3 parts by mass or more of the co-crosslinking agent per 100 parts by mass of the base rubber, it is possible to increase resilience. By including 60 parts by mass or less of the co-crosslinking agent per 100 parts by mass of the base rubber, it is possible to prevent the material molded under heat from the rubber composition from becoming too hard and thus to improve the impact feel of a golf ball.

The amount of inclusion of the co-crosslinking agent is more preferably 5 parts by mass or more and 45 parts by mass or less per 100 parts by mass of the base rubber.

(F) Inert Filler

As the inert filler, one or more inorganic fillers selected from, for example, zinc oxide, barium sulfate, and calcium carbonate may be used.

By adding the inert filler, it is possible to adjust the initial velocity and the specific gravity of a golf ball.

In the case of adding the inert filler, the amount of inclusion of the inert filler is preferably 1 part by mass or more, more preferably, 3 parts by mass or more, and still more preferably, 5 parts by mass or more, per 100 parts by mass of the base rubber.

The upper limit of the amount of inclusion of the inert filler, which is not limited in particular, either, is preferably 100 parts by mass or less, more preferably, 60 parts by mass or less, still more preferably, 45 parts by mass or less, and particularly preferably, 40 parts by mass or less, per 100 parts by mass of the base rubber.

(G) Antioxidant

As described above, the rubber composition may include an antioxidant on an as-needed basis.

Examples of the antioxidant include commercially available products such as Nocrac NS-6, Nocrac NS-30, and Nocrac 200 (all manufactured by Ouchi Shinko Chemical Industry Co., Ltd.). These may be used alone or in any combination.

In the case of adding the antioxidant, the amount of inclusion of the antioxidant is not limited in particular, but is preferably 0.1 parts by mass or more per 100 parts by mass of the base rubber.

In the case of adding the antioxidant, the upper limit of the amount of inclusion of the antioxidant is not limited in particular, either, but is preferably 5.0 parts by mass or less, more preferably, 4.0 parts by mass or less, and still more preferably, 3.0 parts by mass or less, per 100 parts by mass of the base rubber.

By including 0.1 parts by mass or more and 5.0 parts by mass or less of the antioxidant per 100 parts by mass of the base rubber, an appropriate core hardness gradient can be obtained in particular, and resilience, durability, and the spin reducing effect on full shots can be improved in particular.

The core of the golf ball according to this embodiment may be obtained by kneading the above-described rubber composition and vulcanizing and curing the rubber composition in the same manner as known rubber compositions for golf balls. As a condition of vulcanization, for example, the vulcanization temperature is preferably 100° C. or higher and 200° C. or lower, more preferably, 135° C. or higher and 175° C. or lower, and still more preferably, 145° C. or higher and 165° C. or lower.

The vulcanization time, which is not limited in particular, either, may be, for example, 2 minutes or more and 90 minutes or less.

The core diameter is preferably 30 mm or more, more preferably, 32 mm or more, and still more preferably, 34 mm or more. The core diameter of 30 mm or more makes it possible to improve the spin reducing effect in particular and also to increase resilience.

The core diameter is, for example, preferably 40 mm or less, and more preferably, 39 mm or less. The core diameter of 40 mm or less makes it possible to improve the spin reducing effect in particular and also to ensure a sufficient thickness of the cover. Therefore, it is possible to further provide an effect due to the cover.

Furthermore, the deflection hardness of the core (heat-molded material), which is the amount of deflection of the core between the state where an initial load of 98 N (10 kgf) is applied on the core and the state where a final load of 1275 N (130 kgf) is applied on the core, is not limited in particular, but is preferably 2.5 mm or more, more preferably, 2.8 mm or more, and still more preferably, 3.0 mm or more.

By causing the core to have a deflection hardness of 2.5 mm or more, it is possible to improve the spin reducing effect in particular.

The upper limit of the deflection hardness of the core, which is not limited in particular, is preferably 8.0 mm or less, more preferably, 7.8 mm or less, and still more preferably, 7.5 mm or less.

By causing the core to have a deflection hardness of 8.0 mm or less, it is possible to improve the spin reducing effect in particular, and also to increase resilience.

Next, the hardness of the core is described.

The value of a JIS-C hardness difference obtained by subtracting the center hardness of the core from the surface hardness of the core [(core surface hardness)−(core center hardness)] is not limited in particular, but is preferably 20 or more.

The JIS-C hardness difference of 20 or more makes it possible to improve the spin reducing effect in particular.

The upper limit of the JIS-C hardness difference, which is not limited in particular, either, is preferably 40 or less, and more preferably, 35 or less.

The JIS-C hardness difference of 40 or less makes it possible to increase the initial velocity and the distance of an actually struck golf ball. Furthermore, it is possible to increase durability to breakage due to repeated striking, in particular.

Here, the center hardness means the hardness measured at the center of a cross section obtained by cutting the core in half through its center, and the surface hardness means the hardness measured at the surface (spherical surface) of the core. Furthermore, the JIS-C hardness means the hardness measured with a (JIS-C type) spring-type hardness tester as specified in JIS K 6301 (1975).

Next, the cover covering the core is described.

The material of the cover is not limited in particular. Known materials such as various ionomer resins and urethane elastomers used in golf balls may be used.

To achieve a golf ball further reduced in spin rate, it is particularly preferable to use a highly neutralized ionomer material for the layer next to the core.

Specifically, it is preferable to use a mixture material that includes: a resin component including (a) a base resin and (b) a non-ionomeric thermoplastic elastomer; (c) one or more selected from fatty acids having a molecular weight of 228 to 1500 and derivatives thereof; and (d) a basic inorganic metal compound capable of neutralizing unneutralized acid groups in the components (a) and (c).

The base resin (a) may be formulated by blending (a-1) one or more selected from an olefin-unsaturated carboxylic acid binary random copolymer and a metal ion neutralizer of an olefin-unsaturated carboxylic acid binary random copolymer and (a-2) one or more selected from an olefin-unsaturated carboxylic acid-unsaturated carboxylic acid ester ternary random copolymer and a metal ion neutralizer of an olefin-unsaturated carboxylic acid-unsaturated carboxylic acid ester ternary random copolymer in the mass ratio of 100:0 to 0:100.

It is preferable to blend 5 parts by mass or more and 80 parts by mass or less of the component (c) and 0.1 parts by mass or more and 17 parts by mass or less of the component (d), per 100 parts by mass of the resin component formulated by blending the base resin (a) and the non-ionomeric thermoplastic elastomer (b) in the mass ratio of 100:0 to 50:50.

In particular, in the case of using the mixture material of the components (a) through (d), it is preferable that 70% or more of the acid groups of the mixture material be neutralized.

For the material of the outermost layer of the cover, it is preferable to use a urethane material, particularly, a thermoplastic urethane elastomer, as a main material.

Furthermore, one or more cover layers (intermediate layers) may be formed between the layer next to the core and the outermost cover layer. In this case, it is preferable to use a thermoplastic resin such as an ionomer as the material of the intermediate layers.

To obtain the cover of the golf ball according to this embodiment, for example, it is possible to employ a method by which a core manufactured in advance in accordance with a ball type is placed in a mold and the above-described mixture mixed and melted under heat is provided around the core by injection molding to coat the core with a desired cover. In this case, the cover can be manufactured with excellent thermal stability, fluidity, and moldability. As a result, the finally obtained golf ball has high resilience, good impact feel, and good scuff resistance. Cover forming methods that may be employed other than the one described above include, for example, a method by which a pair of hemispheric half cups is molded in advance with the above-described cover material, the core is enclosed in the half cups, and pressure molding is performed on the half cups enclosing the core for 1 to 5 minutes at 120° C. to 170° C.

When the cover has a single layer, the thickness of the cover is preferably, for example, 0.3 mm or more and 3 mm or less. When the cover has two layers, the thickness of the outer layer cover (outermost layer cover) is preferably 0.3 mm or more and 2.0 mm or less and the thickness of the inner layer cover (intermediate layer cover) is preferably 0.3 mm or more and 2.0 mm or less.

Furthermore, the Shore D hardness of each layer of the cover (each cover layer), which is not limited in particular, is preferably 40 or more, and more preferably, 45 or more. The upper limit of the Shore D hardness of each cover layer, which is not limited in particular, either, is preferably 70 or less, and more preferably, 65 or less.

Numerous dimples are formed on the surface of the outermost layer of the cover, and various kinds of treatment such as surface preparation, stamping, and painting may be further performed on the cover. Such surface treatment can be performed on the cover formed of the above-described cover material with good workability because the cover surface has good moldability.

The golf ball according to this embodiment uses the above-described rubber composition as the material of at least one layer of the core, while the core may have two or more layers. When the core has two or more layers, it is preferable to apply the core illustrated in this embodiment to the innermost layer, but the present invention is not limited to this. The golf ball is not limited to a particular type to the extent that the golf ball includes the core and at least one cover layer. Examples of golf ball types include two-piece or three-piece solid golf balls having a solid core coated with a cover and solid golf balls such as multi-piece golf balls having a layer structure of three or more layers.

EXAMPLES

The present invention is specifically described with reference to examples and comparative examples shown below. The present invention, however, is not limited to the following examples.

Examples 1 to 5 and Comparative Examples 1 and 2

[Manufacture of Core]

The cores of Examples 1 to 5 and Comparative Examples 1 and 2 were manufactured using the core materials including polybutadiene as a principal component as shown in Table 2 below.

The composition of the rubber composition was selected such that the obtained golf ball had an initial velocity of 77 m/s and a deflection hardness of 2.40 mm. Furthermore, the specific gravity of the core calculated from the composition is 1.132 g/cm$^3$ in each of the examples and comparative examples as shown in Table 4.

The details of the components of the core materials shown in Table 2 are as follows.

Polybutadiene rubber A: trade name "BR051" (manufactured by JSR Corporation); a cis-1,4-bond content of 95%; a Mooney viscosity [$ML_{1+4}$ (100° C.)] of 38; polymerized with a Nd catalyst Polybutadiene rubber B: trade name "BR01" (manufactured by JSR Corporation); a cis-1,4-bond content of 95%; a Mooney viscosity [$ML_{1+4}$ (100° C.)] of 45; polymerized with a nickel (Ni) catalyst Polybutadiene rubber C: trade name "BR730" (manufactured by JSR Corporation); a cis-1,4-bond content of 95%; a Mooney viscosity [$ML_{1+4}$ (100° C.)] of 56; polymerized with a Nd catalyst Organic peroxide A: Dicumyl peroxide, trade name "Percumyl D" (manufactured by NOF Corporation)

Organic peroxide B: a mixture of 1,1-di(t-butylperoxy) cyclohexane and silica, trade name "Perhexa C-40"

Calcium sulfate 0.5-hydrate: calcined gypsum manufactured by KANTO CHEMICAL CO., INC.

Calcium sulfate dihydrate: calcium sulfate dihydrate manufactured by KANTO CHEMICAL CO., INC.

Aluminum sulfate 14-hydrate: aluminum sulfate 14-hydrate manufactured by KANTO CHEMICAL CO., INC.

Magnesium sulfate heptahydrate: magnesium sulfate heptahydrate manufactured by KANTO CHEMICAL CO., INC.
Water: distilled water manufactured by Wako Pure Chemical Industries, Ltd.
Organosulfur compound: zinc salt of pentachlorothiophenol manufactured by Wako Pure Chemical Industries, Ltd.
Zinc acrylate: manufactured by Nippon Shokubai Co., Ltd.
Barium sulfate: trade name "Barico #100" (manufactured by Hakusui Tech)
Zinc oxide: trade name "Zinc Oxide Grade 3" (manufactured by Sakai Chemical Co., Ltd.)
Antioxidant: trade name "Nocrac NS-6" (manufactured by Ouchi Shinko Chemical Industry Co., Ltd.)

TABLE 2

| | | Example 1 | Example 2 | Example 3 | Example 4 |
|---|---|---|---|---|---|
| Inner layer core composition (part by mass) | Polybutadiene A | — | — | — | — |
| | Polybutadiene B | — | — | — | — |
| | Polybutadiene C | 100.00 | 100.00 | 100.00 | 100.00 |
| | Organic peroxide A | 1.00 | 1.00 | 0.80 | 1.00 |
| | Organic peroxide B | — | — | — | — |
| | Calcium sulfate 0.5-hydrate | 11.43 | — | — | — |
| | Calcium sulfate dihydrate | — | 4.09 | 5.10 | — |
| | Aluminum sulfate 14-hydrate | — | — | — | 3.12 |
| | Magnesium sulfate heptahydrate | — | — | — | — |
| | Water | — | — | — | — |
| | Organosulfur compound | 1.00 | 0.30 | 0.50 | 0.50 |
| | Zinc acrylate | 41.41 | 43.30 | 43.04 | 39.48 |
| | Barium sulfate | — | — | — | — |
| | Zinc oxide | 4.69 | 9.96 | 9.26 | 11.78 |
| | Antioxidant | 0.10 | 0.10 | 0.10 | 0.10 |

| | | Example 5 | Comparative Example 1 | Comparative Example 2 |
|---|---|---|---|---|
| Inner layer core composition (part by mass) | Polybutadiene A | — | 20.00 | 20.00 |
| | Polybutadiene B | — | 80.00 | 80.00 |
| | Polybutadiene C | 100.00 | — | — |
| | Organic peroxide A | 1.00 | 0.60 | 1.00 |
| | Organic peroxide B | — | 0.60 | — |
| | Calcium sulfate 0.5-hydrate | — | — | — |
| | Calcium sulfate dihydrate | — | — | — |
| | Aluminum sulfate 14-hydrate | — | — | — |
| | Magnesium sulfate heptahydrate | 1.75 | — | — |
| | Water | — | — | 0.80 |
| | Organosulfur compound | 0.80 | 0.30 | 0.35 |
| | Zinc acrylate | 40.01 | 29.80 | 42.96 |
| | Barium sulfate | — | 14.94 | 9.43 |
| | Zinc oxide | 12.38 | 4.00 | 4.00 |
| | Antioxidant | 0.10 | 0.10 | 0.10 |

In manufacturing the core, first, of the components shown in Table 2, those other than the organic peroxides and the reagents for adding water, specifically, calcium sulfate 0.5-hydrate, calcium sulfate dihydrate, aluminum sulfate 14-hydrate, magnesium sulfate heptahydrate, and water, were kneaded at or below a temperature of 120° C.

Next, one or both of the organic peroxides were added and one of the reagents for adding water was added (except for Comparative Example 1) to the resultant kneaded material, which was thereafter further kneaded at or below a temperature of 90° C. Thereby, the rubber composition of each of the examples and comparative examples was prepared.

The resultant mixture was vulcanized and molded under the conditions of 155° C. and 19 minutes, thereby manufacturing the core.

[Manufacture of Golf Ball]

A cover famed of two layers, namely, the intermediate layer and the outermost layer having respective thicknesses shown in Table 3 below, was formed on the surface of the manufactured core of each of the examples and comparative examples, using resins having respective compositions shown in Table 3, thereby manufacturing golf balls.

The cover was formed by covering the core with the intermediate layer and the outermost layer in this order by injection molding, thereby obtaining multi-piece solid golf balls having a three-layer structure. At this point, although not graphically illustrated, common dimples having a predetermined pattern were famed in the surface of the cover of the golf ball of each of the examples and comparative example.

The details of the components of the cover material shown in Table 3 are as follows.

Himilan 1706, Himilan 1557, and Himilan 1605: ionomer compounds manufactured by Dupont-Mitsui Polychemicals Co., Ltd.

T-8283 and T-8290: urethane compounds manufactured by DIC-Bayer Polymer, Ltd.

Hytrel 4001: a polyester elastomer manufactured by Dupont-Toray Co., Ltd.

Polyethylene wax: trade name "SANWAX 161-P" manufactured by Sanyo Chemical Industries, Ltd.

Isocyanate compound: 4,4'-Diphenylmethane diisocyanate

Titanium oxide: "TIPAQUE R-680" manufactured by Ishihara Sangyo Kaisha, Ltd.

Trimethylolpropane: manufactured by Mitsubishi Gas Chemical Company, Inc.

TABLE 3

| | | Outermost layer | Intermediate layer |
|---|---|---|---|
| | Thickness (mm) | 0.82 | 1.20 |
| Composition (part by mass) | Himilan 1706 | — | 35 |
| | Himilan 1557 | — | 15 |
| | Himilan 1605 | — | 50 |
| | T-8290 | 75 | — |
| | T-8283 | 25 | — |
| | Hytrel 4001 | 11 | — |
| | Silicon wax | 0.6 | — |
| | Polyethylene wax | 1.2 | — |
| | Isocyanate compound | 7.5 | — |
| | Titanium oxide | 3.9 | — |
| | Trimethylolpropane | — | 1.1 |

[Core Evaluation Method]

The cores manufactured in the examples and comparative examples were evaluated for deflection hardness, outer diameter, weight, and JIS-C hardness difference according to the following procedure. The results are shown in Table 4.

[Deflection Hardness]

The amount of deformation of the core between the state where an initial load of 98 N (10 kgf) was applied on the core and the state where a final load of 1275 N (130 kgf) was applied on the core was determined as the measured value of a single core, and the average of the measured values of thirty cores manufactured under the same conditions was determined as the deflection hardness of the core for each of the examples and comparative examples.

[Outer Diameter]

The core surface was measured at five random points at a temperature of 23.9±1° C., and the average of the measured values was determined as the measured value of a single core. The average of the measured values of five cores manufactured under the same conditions was determined as the outer diameter of the core for each of the examples and comparative examples.

[Weight]

The weight of the core was measured using a plate electronic scale.

[JIS-C Hardness Difference]

The core has a spherical surface. The probe of a hardness tester was set substantially perpendicular to the spherical surface to measure the core surface hardness in JIS-C hardness according to the JIS K 6301 (1975) standard.

With respect to the center hardness of the core, the core was cut in half through its center by a fine cutter, and the center of the cross section was measured in JIS-C hardness.

Then, the JIS-C hardness difference was calculated by subtracting the measured core center hardness from the measured core surface hardness.

[Golf Ball Evaluation Method]

The golf balls manufactured in the examples and comparative examples were evaluated for deflection hardness, outer diameter, weight, spin rate, and durability performance according to the following procedure. The results are shown in Table 4.

[Deflection Hardness]

The amount of deformation (mm) of the golf ball between the state where an initial load of 98 N (10 kgf) was applied on the golf ball and the state where a final load of 1275 N (130 kgf) was applied on the golf ball was measured and determined as the deflection hardness of the golf ball with respect to each of the golf balls manufactured in the examples and comparative examples.

[Outer Diameter]

The golf ball surface was measured at five random dimple-free points at a temperature of 23.9±1° C., and the average of the measured values was determined as the measured value of a single golf ball. The average of the measured values of five golf balls manufactured under the same conditions was determined as the outer diameter of the golf ball for each of the examples and comparative examples.

[Weight]

The weight of the golf ball was measured using a plate electronic scale.

[Spin Rate]

A driver (W #1) "TourStage ViQ" (2012 model) manufactured by Bridgestone Sports Co., Ltd. (loft angle of 11.5°) was mounted on a golf swing robot, and the spin rate of the golf ball immediately after the golf ball was struck by the driver at a head speed (HS) of 45 m/s was measured with an apparatus for measuring the initial conditions.

Furthermore, a number 6 iron (I #6) "TourStage ViQ" (2012 model) manufactured by Bridgestone Sports Co., Ltd. was mounted on the golf swing robot, and the spin rate of the golf ball immediately after the golf ball was struck by the number 6 iron at a head speed (HS) of 38 m/s was measured with the apparatus for measuring the initial conditions.

The spin rate is indicated by the difference from the measurement result of Comparative Example 1 in which no water was added in manufacturing the core. A number smaller than zero indicates a lower spin rate.

[Durability Performance]

The durability of the golf ball was evaluated using an ADC Ball COR Durability Tester manufactured by Automated Design Corporation (U.S.). This tester pneumatically launches a golf ball and thereafter causes the golf ball to sequentially collide with two parallel metal plates. The velocity of incidence on the metal plates was 43 m/s.

The percentage of the number of golf balls cracked before being launched one hundred times among one hundred golf balls manufactured in each of the examples and comparative examples in the case of launching each of the hundred golf balls one hundred times was calculated and determined as durability performance (%). Therefore, the smaller the durability performance (%), the lower the failure rate and the better the durability of the golf ball.

Furthermore, in Examples 1 to 5, the durability performance is as low as 10% or less, and it has been confirmed that the durability is significantly higher than in Comparative Example 2, in which water was included in the rubber composition in manufacturing the core.

All examples and conditional language provided herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that various changes, substitutions, and alterations could be made hereto without departing from the spirit and scope of the invention.

What is claimed is:

1. A golf ball, comprising:
 a core; and
 a cover,
 wherein the core is formed of a material molded under heat from a rubber composition,
 the rubber composition including components (A) through (C), where the components (A) through (C) are
 (A) a base rubber,
 (B) an organic peroxide, and
 (C) a water providing agent, and
 wherein when the rubber composition is kneaded at a kneading temperature and is thereafter vulcanized at a vulcanization temperature, a dissociation rate of the water of the water providing agent in a ease of heating the water providing agent up to the kneading tempera-

TABLE 4

| | | Example 1 | Example 2 | Example 3 | Example 4 |
|---|---|---|---|---|---|
| Core | Specific gravity (g/cm³) | 1.132 | 1.132 | 1.132 | 1.132 |
| | Deflection hardness (mm) | 3.12 | 3.18 | 2.99 | 3.01 |
| | Outer diameter (mm) | 38.71 | 38.51 | 38.53 | 38.60 |
| | Weight (g) | 35.27 | 34.61 | 34.71 | 34.76 |
| | Surface hardness - center hardness (JIS-C) | 32.5 | 32.5 | 38.1 | 25.7 |
| Golf ball | Deflection hardness (mm) | 2.40 | 2.40 | 2.40 | 2.40 |
| | Outer diameter (mm) | 42.69 | 42.70 | 42.70 | 42.71 |
| | Weight (g) | 45.48 | 45.34 | 45.38 | 45.33 |
| | Initial velocity (m/s) | 77 | 77 | 77 | 77 |
| | Spin rate (rpm) Driver W#1 | −56 | −62 | −122 | −36 |
| | Iron I#6 | −243 | −253 | −402 | −168 |
| | Durability performance (%) | 3.5 | 2.5 | 8.1 | 4.2 |

| | | Example 5 | Comparative Example 1 | Comparative Example 2 |
|---|---|---|---|---|
| Core | Specific gravity (g/cm³) | 1.132 | 1.132 | 1.132 |
| | Deflection hardness (mm) | 2.87 | 2.81 | 3.10 |
| | Outer diameter (mm) | 38.59 | 38.65 | 38.57 |
| | Weight (g) | 34.85 | 34.96 | 34.81 |
| | Surface hardness - center hardness (JIS-C) | 27.9 | 19.0 | 29.8 |
| Golf ball | Deflection hardness (mm) | 2.40 | 2.40 | 2.40 |
| | Outer diameter (mm) | 42.70 | 42.69 | 42.71 |
| | Weight (g) | 45.40 | 45.42 | 45.47 |
| | Initial velocity (m/s) | 77 | 77 | 77 |
| | Spin rate (rpm) Driver W#1 | −77 | 0 | −165 |
| | Iron I#6 | −218 | 0 | −389 |
| | Durability performance (%) | 7.5 | 0.0 | 11.0 |

From the results shown in Table 4, in Examples 1 to 5, in which the rubber composition includes a water providing agent, the spin rate was negative both in the case of using the driver and in the case of using the iron, and it has been confirmed that the spin rate is lower than in the case of Comparative Example 1, in which no water is included in the rubber composition.

ture is 60% by mass or less, the water providing agent releases water at the vulcanization temperature during the vulcanization, and the dissociation rate of the water of the water providing agent in a case of heating the water providing agent up to the vulcanization temperature is 60% by mass or more.

2. The golf ball as claimed in claim 1, wherein a moisture content of the water providing agent in a molecular formula thereof is 6% by mass or more.

3. The golf ball as claimed in claim 1, wherein the dissociation rate of the water of the water providing agent in a case of heating the water providing agent up to 155° C. is 60% by mass or more.

4. The golf ball as claimed in claim 1, wherein a JIS-C hardness difference obtained by subtracting a center hardness of the core from a surface hardness of the core is 20 or more.

5. The golf ball as claimed in claim 1, wherein the rubber composition further includes 0.1 parts by mass or more and 5 parts by mass or less of an organosulfur compound per 100 parts by mass of the base rubber.

6. The golf ball as claimed in claim 1, wherein the water providing agent is a hydrate of an inorganic compound.

7. The golf ball as claimed in claim 1, wherein the dissociation rate of the water of the water providing agent in a case of heating the water providing agent up to 90° C. is 60% by mass or less.

8. The golf ball as claimed in claim 1, wherein the dissociation rate of the water of the water providing agent at a start of the vulcanization is 60% by mass or less and reaches 60% by mass or more and 100% by mass or less during the vulcanization.

* * * * *